United States Patent [19]
Gretz

[11] Patent Number: 5,804,764
[45] Date of Patent: Sep. 8, 1998

[54] TWO-PIECE SIDING BOX

[75] Inventor: Thomas J. Gretz, Clarks Summit, Pa.

[73] Assignee: Arlington Industries, Inc., Scranton, Pa.

[21] Appl. No.: 410,096

[22] Filed: Mar. 24, 1995

[51] Int. Cl.⁶ .................................................... H01H 9/02
[52] U.S. Cl. ............................................. 174/53; 220/3.3
[58] Field of Search ............................ 174/17 R, 50, 174/48, 58, 53, 66; 220/3.3, 3.8

[56] References Cited

U.S. PATENT DOCUMENTS

| | | | |
|---|---|---|---|
| 3,365,156 | 1/1968 | Beck | 174/58 |
| 4,012,580 | 3/1977 | Arnold | 174/53 |
| 4,082,915 | 4/1978 | Silver | 174/51 |
| 4,134,636 | 1/1979 | Kleinatland et al. | 339/122 |
| 5,223,673 | 6/1993 | Mason | 174/53 |
| 5,549,266 | 8/1996 | Mitchell et al. | 248/205.1 |

*Primary Examiner*—Hyung S. Sough
*Assistant Examiner*—Dhiru R. Patel

[57] ABSTRACT

An outdoor two-piece siding box and cover assembly easily adapted for mounting devices such as electrical outlets, light fixtures, or water faucets. The box and cover assembly may be adapted for several different end uses, with the box having an outwardly extending wall and bosses and the cover having a wall that mates in a contiguous manner inside the wall of the box. The box and cover are held together by the device mounted thereto being screwed into the bosses.

1 Claim, 7 Drawing Sheets

TWO-PIECE SIDING BOX

FIELD OF THE INVENTION

This invention relates to an electrical outlet box comprising two pieces for mounting outdoors on a building to which outdoor fixtures such as lighting fixtures and outdoor receptacles may be attached.

BACKGROUND OF THE INVENTION

Devices for outdoor fixtures commonly feature several configurations to accommodate various fixtures or devices and are usually in the form of covers for standard electrical outlet boxes. A base is commonly used to provide anchoring to an outdoor wall of a building. A cover plate is usually provided in several configurations to provide a cover for an electrical outlet box, a pleasing pedestal for a fixture or device at its juncture with the building, and an opening for the passage of wiring or other connections between the fixture and the outlet box. These fixtures or devices are typically lighting fixtures or electrical receptacles but could be water faucets or other devices. As the openings for the various fixtures are of different sizes and shapes, manufacturers typically provide several cover plates to cover the range of fixtures that are typically mounted on the exterior of buildings.

SUMMARY OF THE INVENTION

This invention provides two embodiments of an electrical outlet box and two embodiments of a cover that can accommodate several standard fixtures including lighting fixtures, outdoor electrical receptacles, and other devices. The preferred embodiment of the cover contains a standard size opening that satisfies all applications. Another embodiment of the cover may be adapted for various size openings by breaking away portions of the cover.

The preferred embodiment of the outlet box may be installed as is on a bare wall that will have lap siding subsequently installed or may be adapted for attachment to an outdoor wall with lap siding in place by breaking away a flanged portion along pre-formed score lines. A second embodiment of the outlet box is a flangeless box that may be attached directly to an outdoor wall with lap siding in place by cutting an appropriately sized opening in the siding and inserting and anchoring the flangeless box therein.

OBJECTS AND ADVANTAGES

A first object of the present invention is to provide a siding block unit which comprises a complete electrical junction box with a cover. A standard electrical box is required to be used in conjunction with other siding blocks currently being used in the field. This invention eliminates the need to cut holes in the cover member to drop a standard electrical box as required in other siding blocks. The present invention provides a secure junction box for completing electrical connections within the enclosure and an attractive cover for the base of the installed fixture.

A second object of the present invention is to provide an outdoor electrical outlet box in one configuration that will accommodate several typical end uses. These end uses may be lighting or other electrical fixtures, single or duplex receptacles mounted either vertically or horizontally, single or duplex switches, ground fault interruptor switches, ground fault interruptor receptacles, or similar devices. Two embodiments of the box and two embodiments of a cover member are provided for allowing the flexibility for accommodating these several end uses.

The preferred embodiment of the cover features breakaway portions that may be removed selectively to fit the application. Another embodiment of the cover features a standard size opening to also accommodate several end uses.

Another object of the present invention is to provide an outdoor electrical box which may be applied to an existing outdoor wall having lap siding or to a newly constructed outdoor wall on which lap siding will subsequently be applied. The preferred embodiment of the electrical outlet box has a mounting plate with a breakaway flange to accomplish this. If being applied to a new wall, the flange is kept intact with the box and the lap siding is cut to buttress an extended portion of the box. If being applied to an existing wall having lap siding, the flange is broken away and is fitted inside an aperture cut in the siding to accommodate the box.

A second embodiment of the electrical outlet box is a flangeless box which may be applied to an existing wall. For this embodiment, the box is fitted inside an aperture cut in the siding with no existing flange to break away.

Other objects and advantages of the present invention will be better understood from the following description when read in conjunction with the appropriate drawings.

DESCRIPTION OF THE INVENTION

The present invention comprises a two-piece siding box and cover assembly that work to form an outdoor mount adaptable for various fixtures. Two embodiments of the box and two embodiments of the cover are provided. For decorative purposes, two versions of each embodiment of the cover member are provided, an octagon shaped cover and an elongated octagon shaped cover.

The preferred embodiment of the cover has one standard size opening and will work in conjunction with either embodiment of the box. A separate embodiment of the cover has breakaway portions to allow configuring the cover for various fixtures and devices.

The preferred embodiment of the box is a flanged electrical outlet box that has breakaway lines that allow removal of an outer peripheral flange when the box is to be installed on an outdoor wall which has had siding previously installed. A second embodiment of the box, a flangeless version, may be installed in an opening cut in the siding on an outdoor wall and eliminates the need to remove a flange from the outer periphery of the box prior to installation.

Figure 1:
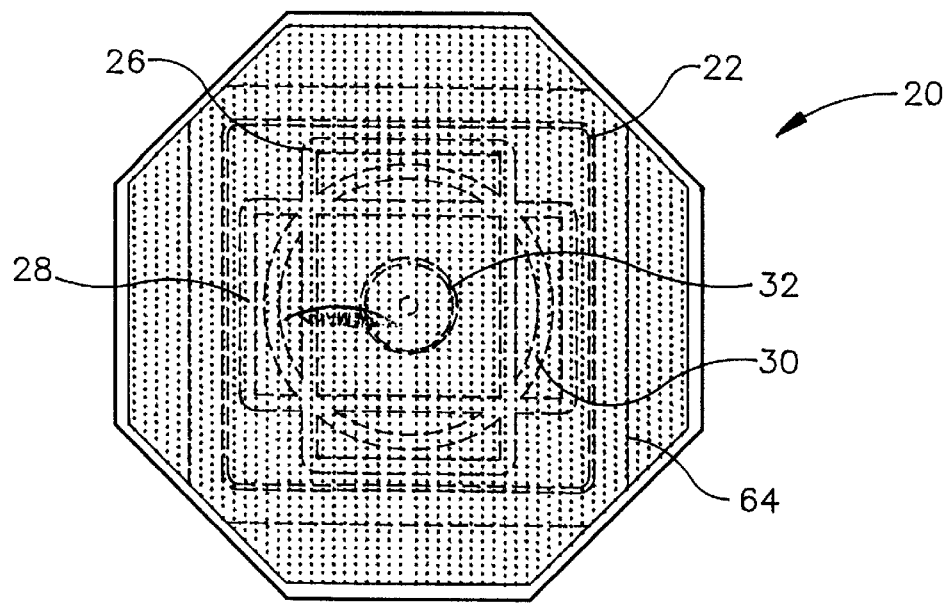
FIG. 1 is a front view of a cover member of a first embodiment of the present invention having an octagon shape with breakaway portions shown in single dashed lines.

A first embodiment of the cover 20 in an octagon shape is depicted in FIG. 1 as viewed from the front. Breakaway portions are shown in single dashed lines. The location of an integral continuous wall 22 is shown in double dashed lines.

Figure 2:
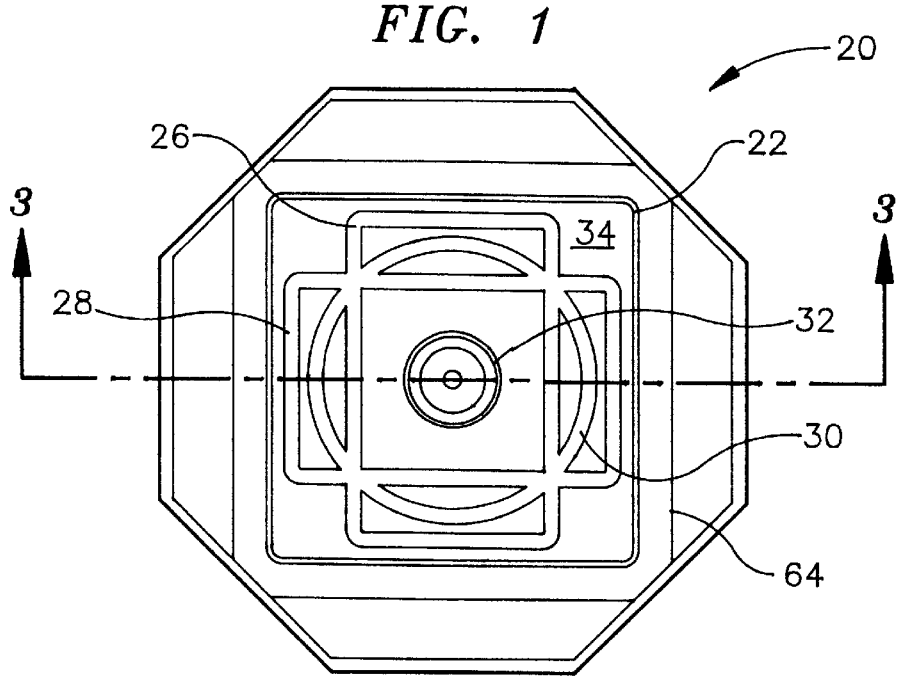
FIG. 2 is a view of the back of the cover shown in FIG. 1.

FIG. 2 depicts the first cover embodiment of FIG. 1, an octagon shaped cover member 20 as viewed from the back. The integral continuous wall 22 extends from the back surface 34 of the cover member. Depicted in FIG. 2 are breakaway grooves 26 for the mounting of a vertical electrical receptacle, breakaway grooves 28 for the mounting of a horizontal electrical receptacle, breakaway grooves 30 for the mounting of a circular light fixture, and breakaway grooves 32 for the mounting of a water faucet. A line 64 is provided outwardly of the continuous wall 22 for outlining the shape of the octagon shaped cover member to a square shape with chamfered corners.

Figure 3:
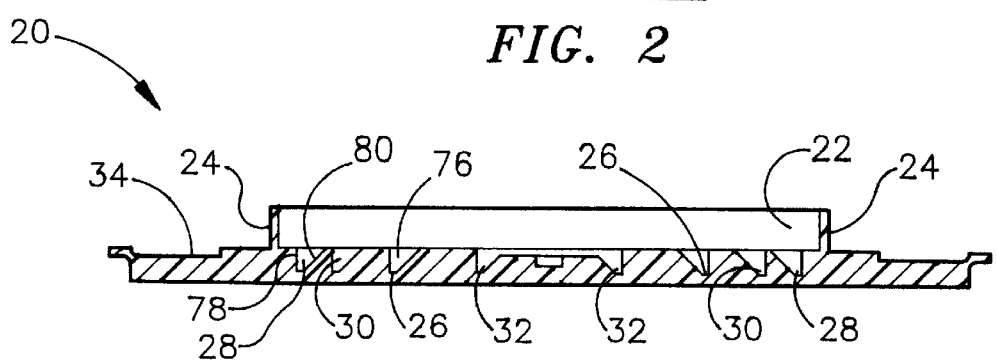
FIG. 3 is a cross-sectional view of the first embodiment of the cover taken along lines 3—3 of FIG. 2 and showing the front side of the cover at the bottom of the figure and the back side with the integral wall at the top.

FIG. 3 shows a cross-sectional view of the octagon shaped cover member 20 taken along lines 3—3 of FIG. 2 and showing the integral continuous wall 22 extending perpendicularly from the back surface 34. An outer surface 24 of the continuous wall 22 is shown. Breakaway grooves are shown for a horizontal electrical receptacle 28, a lighting fixture 30, a vertical electrical receptacle 26, and a water faucet or other device 32. The breakaway grooves are V-shaped cuts 76 formed in the back surface 34 of the cover 20. The V-shaped cuts are formed with a short side 78 and a long side 80 of the V. To configure the cover member 20 for a given application, the desired breakaway portion is removed by scoring with a razor knife in the proper breakaway groove and then hammering or breaking out the proper portion. The design of the V-shaped grooves 76 which extend through most of the cover member's thickness with a short side 78 and a long side 80 guides the razor knife for easy scoring of the cover for the proper configuration.

Figure 4:
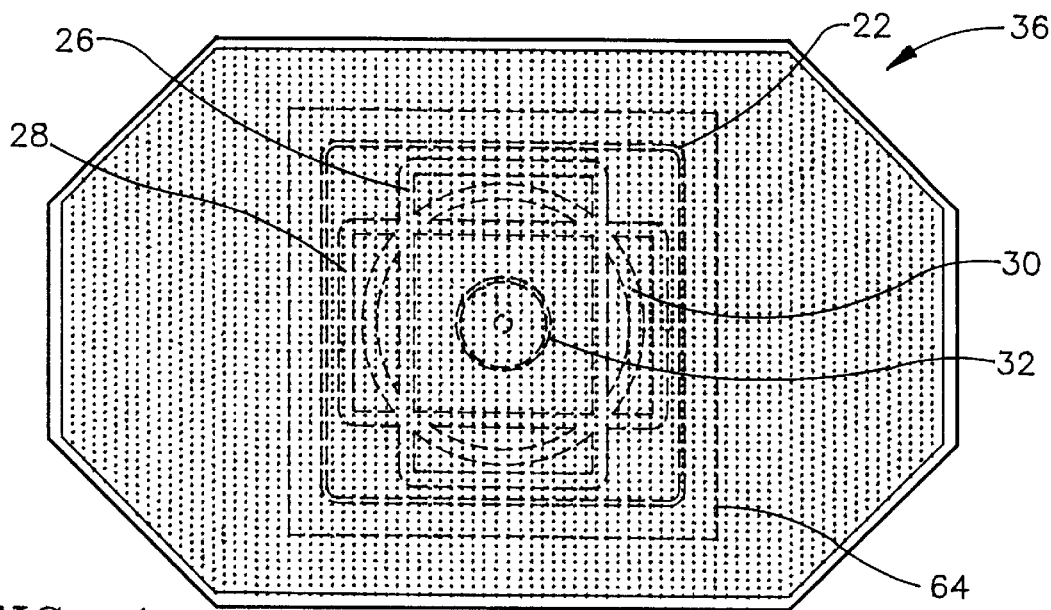
FIG. 4 is a front view of another version of the first embodiment of the cover member of the present invention having an elongated octagon shape with breakaway portions shown in single dashed lines.
Figure 5:
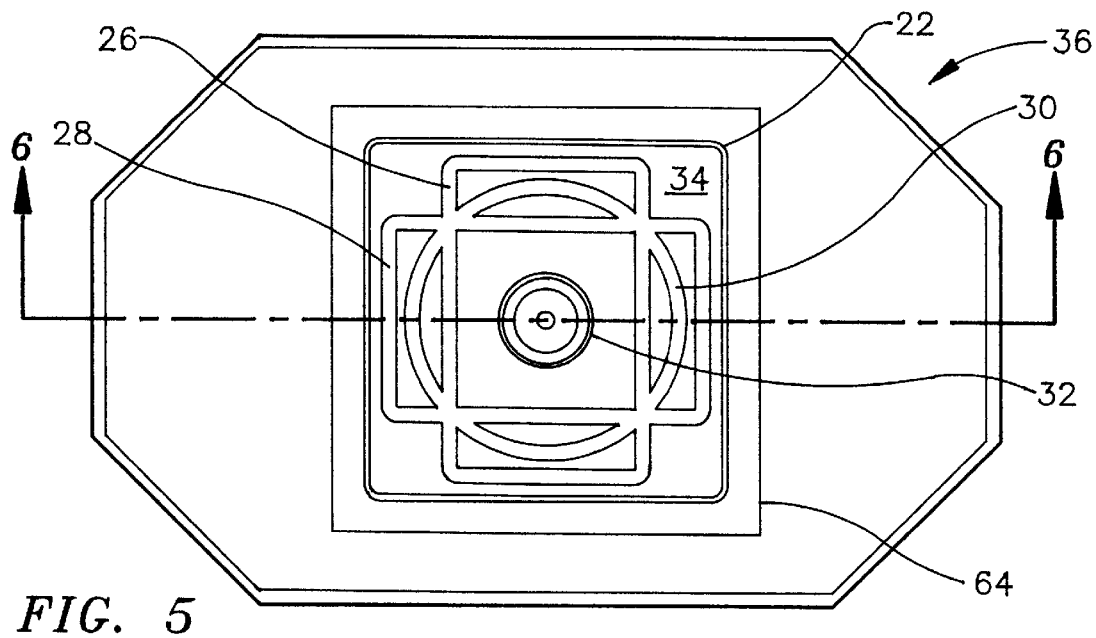
FIG. 5 is a view of the back of the cover shown in FIG. 4.

FIG. 4 is a front view of an elongated octagon shaped cover member 36 of the present invention, another version of the first embodiment of the cover. FIG. 5 is a view of the back surface 34 of the elongated octagon cover 36. The relative location of the breakaway grooves for the vertical electrical receptacle 26, the horizontal electrical receptacle 28, the light fixture 30, and the water faucet or similar device 32 are shown in FIGS. 4 and 5.

Figure 6:
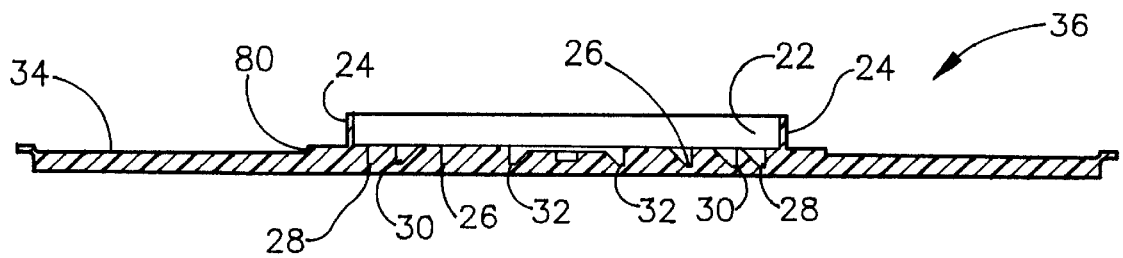
FIG. 6 is a cross-sectional view taken along lines 6—6 of FIG. 5 showing the front side of the cover at the bottom of the figure and the back side with the integral wall at the top.

FIG. 6 is a cross-sectional view of the elongated octagon shaped cover taken along lines 6—6 of FIG. 5 and showing the back surface 34 of the cover at the top of the figure. The integral continuous wall 22 with outer surface 24 extends perpendicularly from the back surface 34 of the cover 36. V-shaped grooves are shown for the horizontal electrical receptacle 28, the light fixture 30, the vertical electrical receptacle 26, and the water faucet 32. The elongated octagon shaped cover 36 has relief line 64 for aesthetic reasons.

Figure 7:
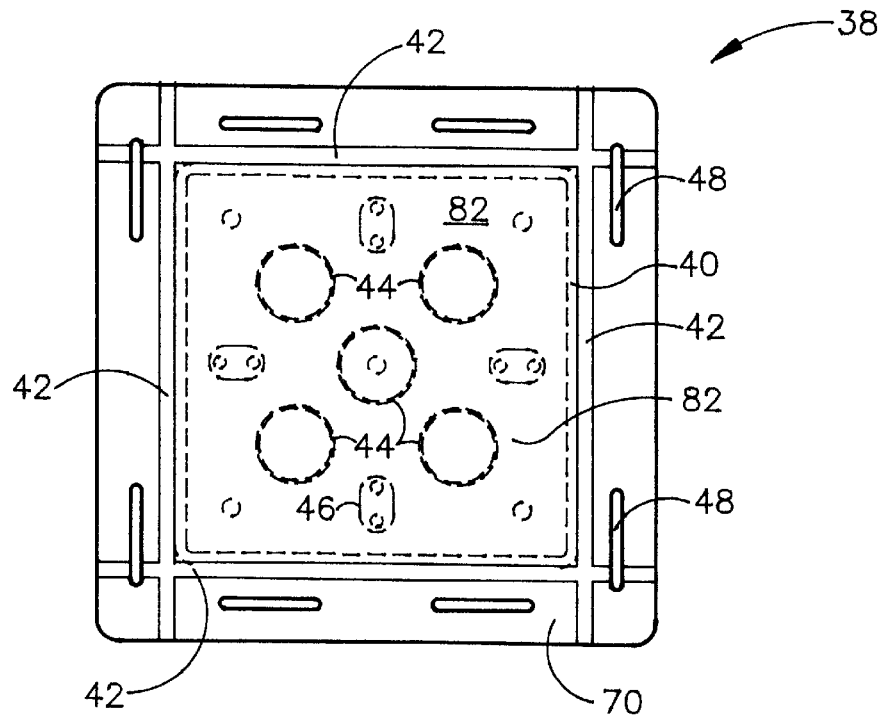
FIG. 7 is a rear view of the preferred embodiment of the electrical outlet box of the present invention with the integral peripheral wall, knockouts and bosses shown in dashed lines.

FIG. 7 is a rear view of the preferred embodiment of the electrical outlet box 38 including breakaway grooves 42 formed in the rear surface 82. The breakaway grooves 42 are positioned immediately outside the outer periphery of an integral peripheral wall 40 on the opposite side of the box 38.

Figure 8:
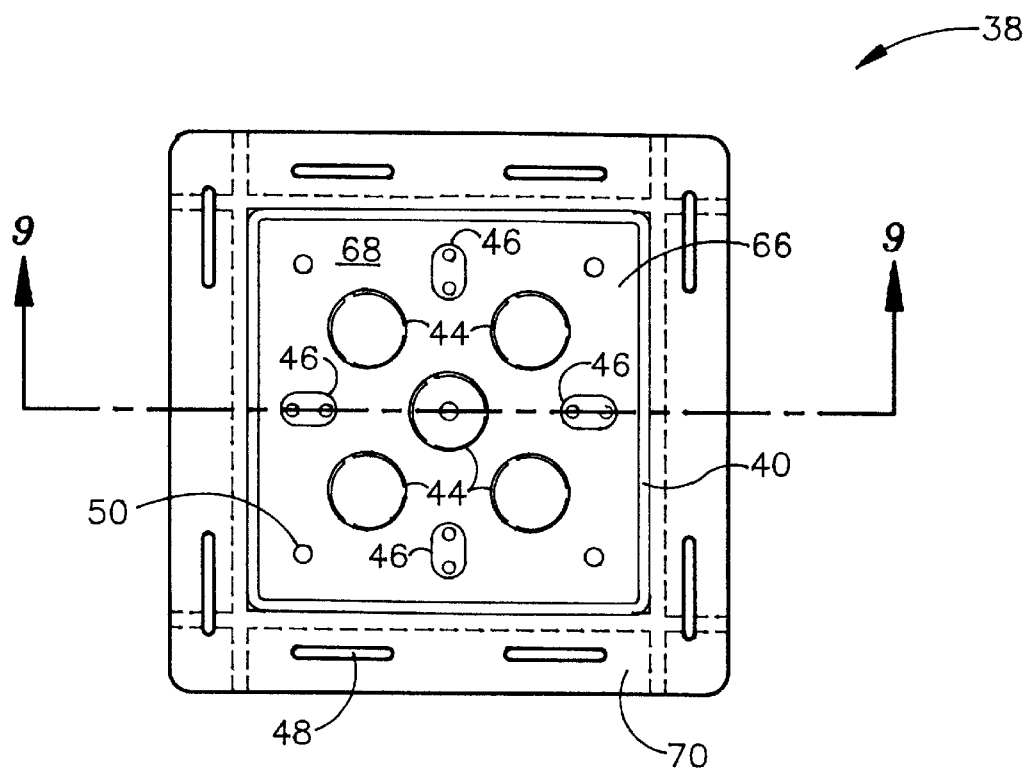
FIG. 8 is a front view of the box of FIG. 7.

The integral peripheral wall 40 is shown better in FIG. 8, a front view of the preferred embodiment of the box. The box 38 is comprised of a rear wall 66 having a front surface 68. Extending from the front surface 68 is the integral peripheral wall 40 and several bosses 46. Knockout sections 44 are provided on the rear wall 66 for creating openings for bringing in electrical or plumbing lines, depending on the application. Extending from the rear wall 66 in substantially the same plane as the rear wall is an integral flange 70. Areas for connecting the box 38 to an outdoor wall are provided exterior of the peripheral wall 40 by slots 48 in the integral flange 70 and interior of the peripheral wall 40 by mounting holes 50. If the box 38 is installed on an unfinished exterior wall then the box will typically be secured by nails or other fastening means through slots 48 in integral flange 70.

Figure 9:
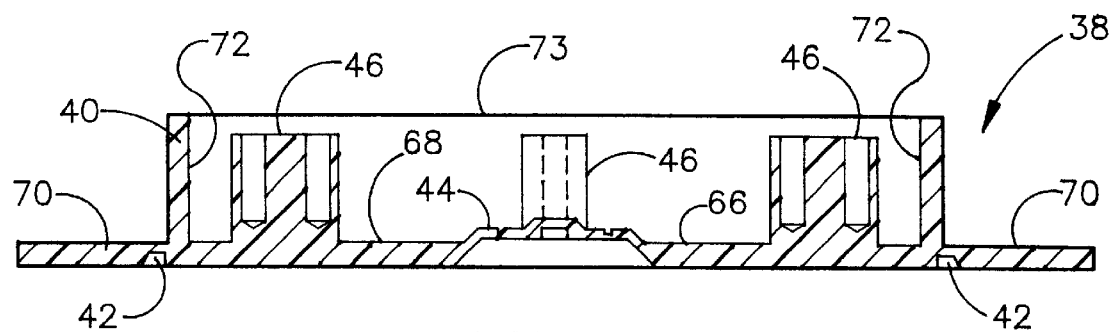
FIG. 9 is a cross-sectional view of the preferred embodiment of the box taken along lines 9—9 of FIG. 8 and showing at the top of the figure the bosses and integral peripheral wall extending from the front surface of the box.

FIG. 9 is a cross-sectional view of the preferred embodiment of box 38 taken along lines 9—9 of FIG. 8 and showing the bosses 46 and the integral peripheral wall 40 extending from the front surface 68 of the box. Integral peripheral wall 40 has an inner surface 72 and an edge 73. Integral flange 70 is shown extending from the rear wall 66 in the same plane as the rear wall 66 of the box 38.

Figure 10:
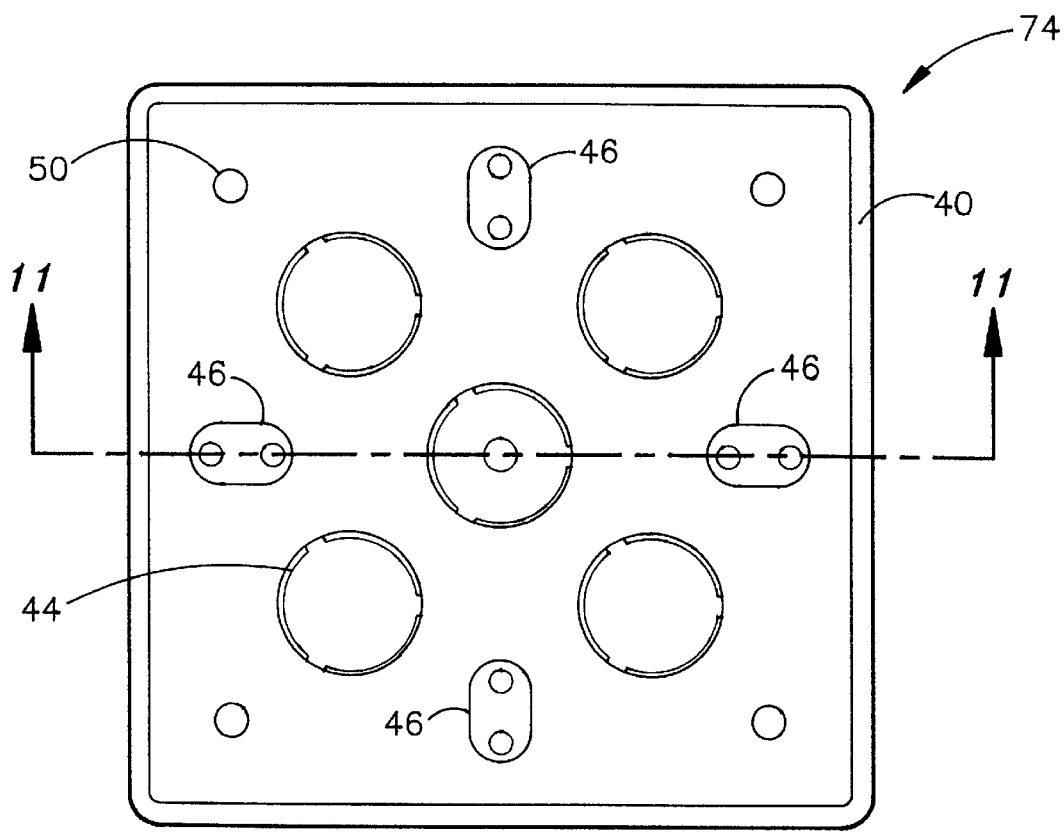
FIG. 10 is a front view of the box of FIG. 7 with the integral flange broken away or omitted, or of a flangeless box which is a second embodiment of the outlet box, as they would appear when mounting the box on an existing outdoor wall having lapped siding already installed.

FIG. 10 depicts a second embodiment of the box 74 with the integral flange 70 omitted, as it would be if it were installed on a finished wall in which the siding is already in place. FIG. 10 would also be a depiction of the first embodiment of the box with the flange broken away. For the flangeless embodiment of the box or for the flanged embodiment with the flange broken away, an aperture is formed in the siding of a size approximate the outer periphery of the integral peripheral wall 40, integral flange 70 is broken away or omitted at the outer periphery of the integral peripheral wall 40, and the flangeless box 74 is slipped into the aperture. The flangeless box 74 is then secured to the underlayment wall by means of nails or other fastening means through mounting holes 50 and caulking may be applied around the periphery.

Figure 11:
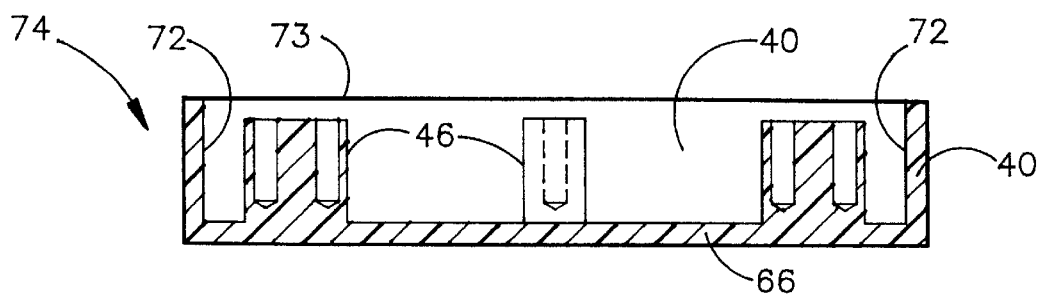
FIG. 11 is a cross-sectional view of the box taken along lines 11—11 in FIG. 10.

FIG. 11 is a cross-sectional view of the flangeless embodiment of the box 74 taken along line 11—11 of FIG. 10. The integral peripheral wall 40 with inner surface 72 and edge 73 is depicted along with bosses 46 extending from rear wall 66.

The electrical box is typically constructed of General Electric's NORYL plastic or similar heat resistant plastic. Heat generated by the fixture can transfer through the screws which are mounted into the box, holding the fixture or device up. If the box is constructed of a non-heat resistant plastic such as PVC, the screws can receive heat from the fixture and degrade the strength of the non-heat resistant plastic thereby causing the fixture to fall.

Figure 12:
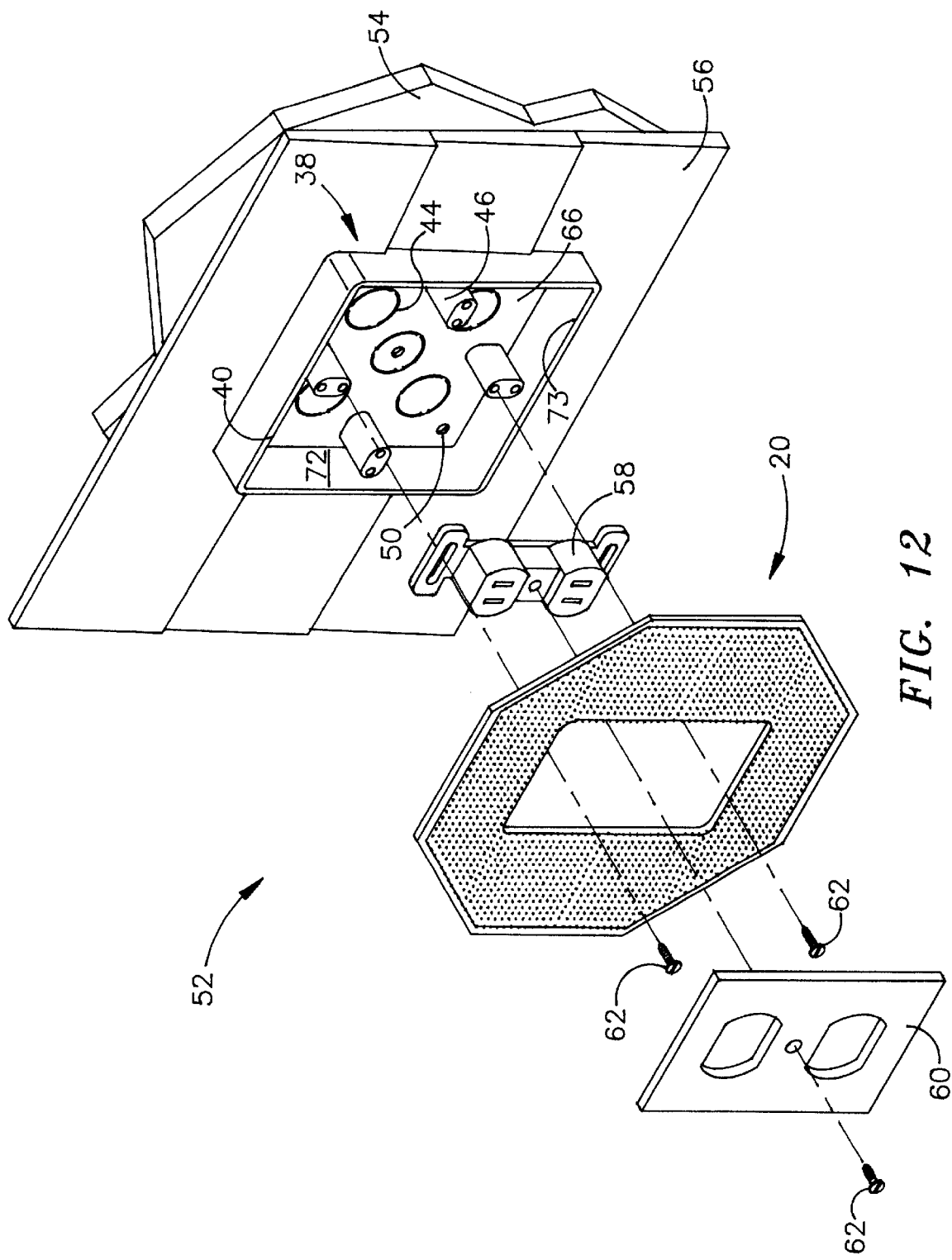
FIG. 12 is a exploded perspective view of the box secured within lapped siding, an electrical receptacle in a vertical orientation, an octagon shaped cover member and a receptacle cover in the proper sequence for installation on the exterior wall of a building.

FIG. 12 is an exploded perspective view of the outdoor box and cover assembly 52 of the present invention. Shown in FIG. 12 is a box secured within lapped siding 56, an electrical receptacle 58 in a vertical orientation, an octagon shaped cover member 20 and a receptacle cover 60 in the proper sequence for installation on the exterior wall of a building. Cover member 20 has had the proper portion removed to configure it for a vertical receptacle by scoring with a razor knife along the proper V-shaped groove and breaking out the proper portion. The box in this figure could be either the flanged or flangeless type as no distinction is made in the drawing as to means of installation. The box is secured to the underlayment wall 54 by nails or other fastening means through either slots in the integral flange on the box or mounting holes 50 in the rear wall 66 of the flangeless embodiment of the box. The flanged embodiment of the box is typically used on new walls in which siding is being applied. The flangeless embodiment of the box is typically used on existing walls having siding in place.

FIG. 12 therefore shows the box 38 secured to the outdoor wall with siding extending to the outer periphery of the peripheral wall 40. Peripheral wall 40 has an inner surface 72 and an edge 73. Electrical receptacle 58 is oriented vertically and secured with screws 62 in integral bosses 46 extending from the rear wall 66 of the box. One or more of knockouts 44, although shown intact in the drawing, may be removed for providing an electrical cable. An octagon shaped cover 20 is then inserted into the box 38 so that the exterior periphery of the cover's integral wall 22 (not depicted) is loosely received within the interior periphery of the peripheral wall 40 of the box. Once inserted, the exterior surface of the integral wall of cover 20 (not depicted) is contiguous with the inner surface 72 of the peripheral wall 40 of the box 38. If desired, the fit between the integral wall 22 of the cover and the peripheral wall 40 of the box may mate in a frictional fit rather than a loose fit, but the loose fit is desired. The integral wall of the cover member 20 is inserted within the peripheral wall 40 of the box 38 until the edge 73 of the peripheral wall 40 contacts the back surface (not depicted) of the cover 20. Cover member 20 is then held to the box 38 in this application depicted in FIG. 12 by securing a standard receptacle cover 60 to the electrical outlet 58 by means of screw 62.

In a manner analogous to that depicted in FIG. 12 and described above, the box and first embodiment of the cover may be combined with a horizontal electrical receptacle, a light fixture, or a water faucet by properly scoring and removing the proper portion delineated by the V-shaped grooves in the back side of the cover member. The preferred embodiment of the cover with its standard size opening may be combined with any of these same devices. The cover member employed in the installation may be either the octagon shape or the elongated octagon.

Figure 13:
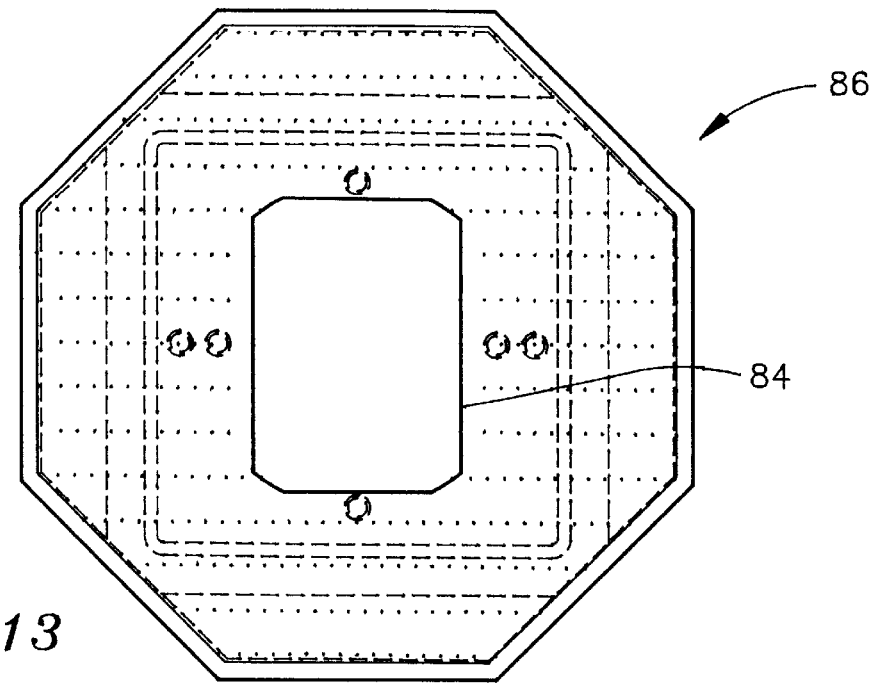
FIG. 13 is a front view of a cover member of a second and preferred embodiment of the present invention having an octagon shape and an opening for the passage of wiring or other devices therethrough.

The preferred embodiment of the cover 86 in an octagon shape is depicted in FIG. 13 as viewed from the front. An opening 84 is provided in the cover 86 to allow for the passage of wiring or other devices therethrough. The size of the opening, typically 2.05 inches by 2.90 inches, is such that it will accommodate most standard size devices such as fixtures, receptacle covers, etc., but not so large as to create an open area between the mounted device and the cover. This one hole in the cover should suffice for virtually all applications.

Figure 14:
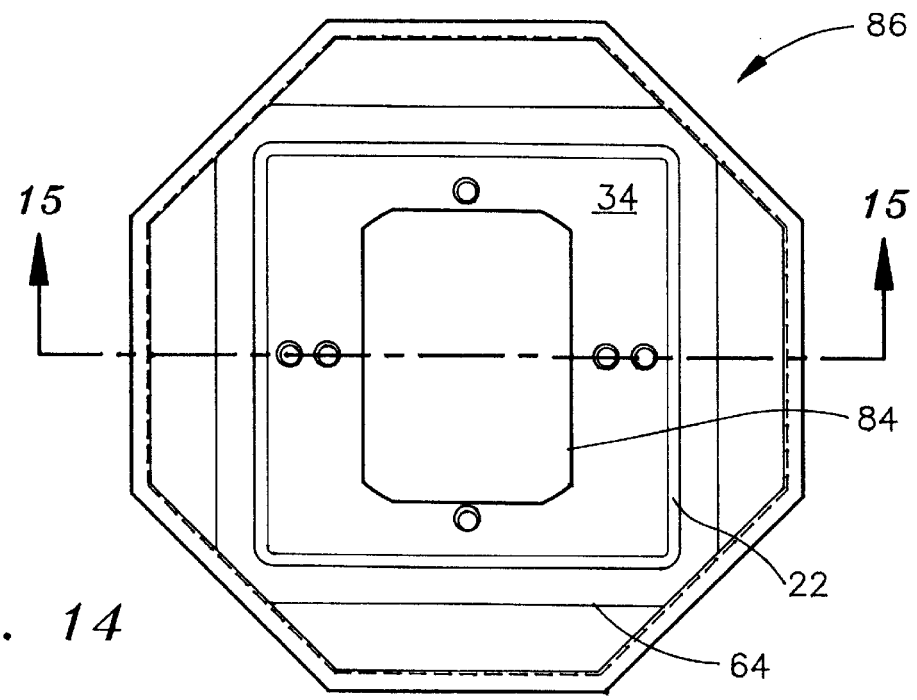
FIG. 14 is a view of the back of the cover shown in FIG. 13.

FIG. 14 depicts the preferred embodiment of FIG. 13, an octagon shaped cover member 86 with an opening 84 as viewed from the back. The integral continuous wall 22 extends from the back surface 34 of the cover member. A line 64 is provided outwardly of the continuous wall 22 for outlining the shape of the octagon shaped cover member to a square shape with chamfered corners.

Figure 15:
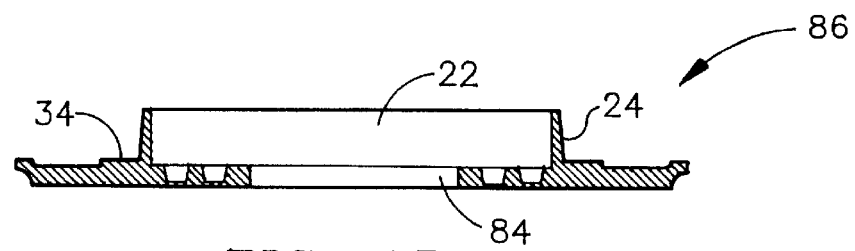
FIG. 15 is a cross-sectional view of the preferred embodiment of the cover taken along lines 15—15 of FIG. 14.

FIG. 15 shows a cross-sectional view of the octagon shaped cover member 86 with an opening 84 taken along lines 15—15 of FIG. 14 and showing the integral continuous wall 22 extending perpendicularly from the back surface 34. An outer surface 24 of the continuous wall 22 is shown.

Figure 16:
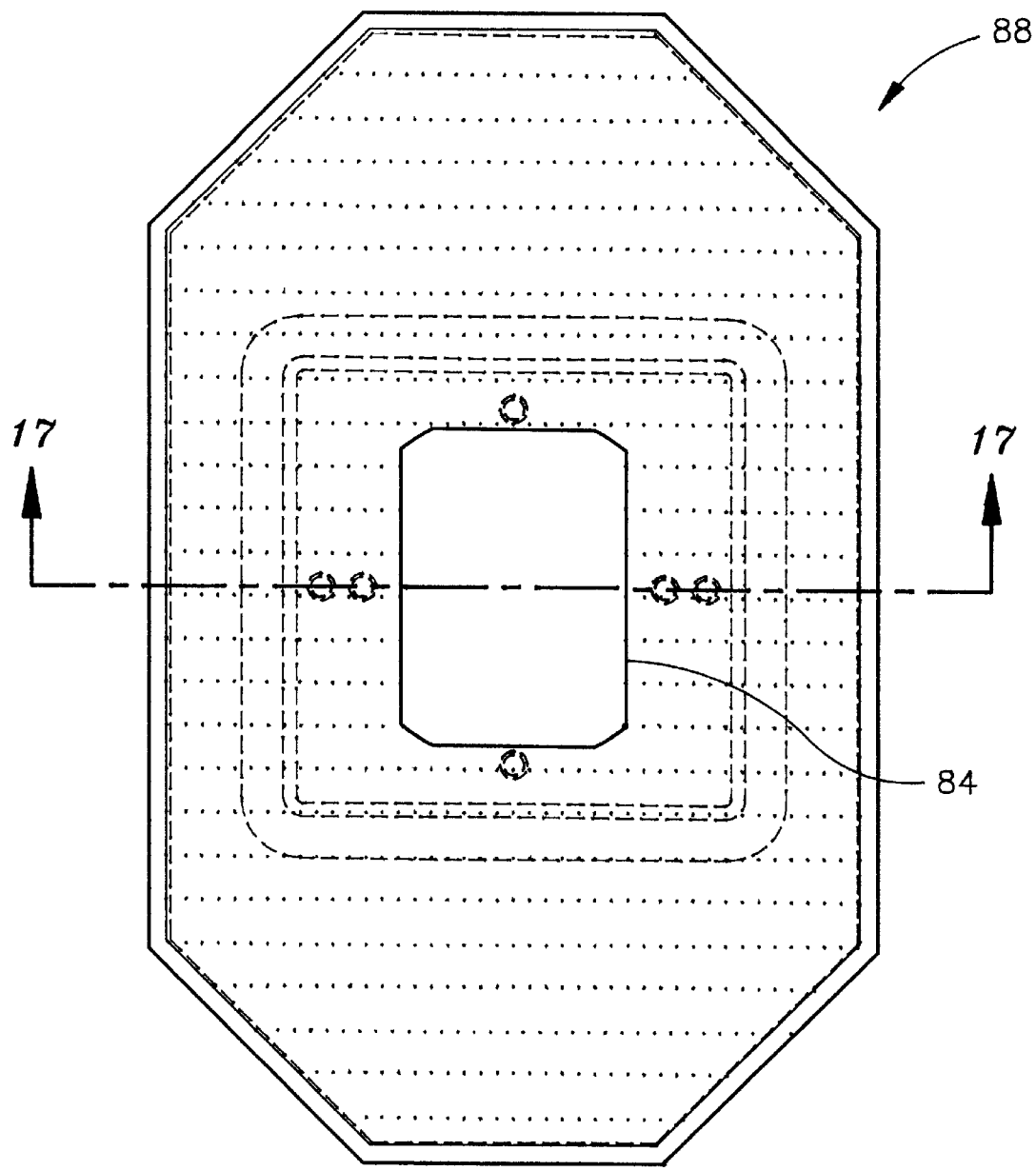
FIG. 16 is a front view of a cover member of the second and preferred embodiment having an elongated octagon shape and an opening for the passage of wiring or other devices therethrough.

The preferred embodiment of the cover 88 in an elongated octagon shape is depicted in FIG. 16 as viewed from the front. An opening 84 is provided in the cover 88 to allow for the passage or wiring or other devices therethrough. The size of the opening is typically 2.05 inches by 2.90 inches. As for the octagon shaped version of the preferred embodiment of the cover, the cover will accommodate most standard size devices such as fixtures, receptacle covers, etc. This one hole in the cover should suffice for virtually all applications.

Figure 17:
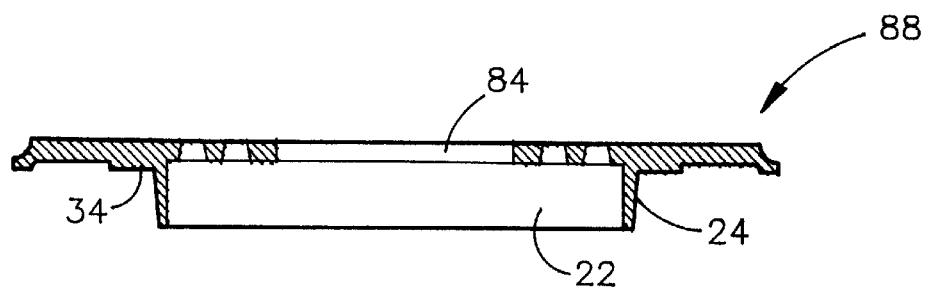
FIG. 17 is a cross-sectional view of the preferred embodiment of the cover taken along lines 17—17 of FIG. 16.

FIG. 17 shows a cross-sectional view of the elongated octagon cover member 88 with an opening 84 taken along lines 17—17 of FIG. 16.

Having thus described the invention with reference to a preferred embodiment, it is to be understood that the invention is not so limited by the description herein but is defined as follows by the appended claims.

What is claimed is:

1. A two-piece siding box and cover assembly comprising:

a box having a rear wall including a front surface;

an integral continuous peripheral wall having an inner surface and an outer surface extending perpendicular to said rear wall from said front surface;

an integral flange extending outwardly of said peripheral wall of said box in the same plane as said rear wall;

breakaway grooves in said rear wall for removing said flange from said box at a position located immediately outside said peripheral wall;

a cover for said box including a back surface and an outer periphery; and an integral continuous wall extending perpendicular to said back surface of said cover, said continuous wall of said cover dimensioned such that it may be received within said peripheral wall of said box whereby an outer surface of said continuous wall of said cover is contiguous to said inner surface of said peripheral wall of said box.

* * * * *